United States Patent
Hazra et al.

(10) Patent No.: US 7,733,772 B2
(45) Date of Patent: Jun. 8, 2010

(54) DYNAMIC SELECTION OF COMMUNICATION LINKS IN A MIXED NETWORK

(75) Inventors: Mousumi Hazra, Beaverton, OR (US); Pravin Mane, Hillsboro, OR (US); Rik Logan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 11/339,456

(22) Filed: Jan. 25, 2006

(65) Prior Publication Data

US 2007/0171936 A1    Jul. 26, 2007

(51) Int. Cl.
H04L 12/26 (2006.01)
H04W 4/00 (2009.01)
H04W 72/00 (2009.01)
G06F 15/173 (2006.01)

(52) U.S. Cl. .............. 370/230; 370/237; 370/338; 455/453; 709/241

(58) Field of Classification Search ......... 370/229–238, 370/315–348, 395.21, 396, 351–356; 455/422.1–426.2, 455/445–453; 709/223, 225–226, 229, 230–235, 709/238–244, 249–250
See application file for complete search history.

(56) References Cited

U.S. PATENT DOCUMENTS

| | | | | |
|---|---|---|---|---|
| 5,983,098 | A * | 11/1999 | Gerszberg et al. | 455/426.1 |
| 6,131,136 | A * | 10/2000 | Liebenow et al. | 710/316 |
| 6,512,755 | B1 * | 1/2003 | Deschaine et al. | 370/338 |
| 6,741,870 | B1 * | 5/2004 | Holmstrom et al. | 455/557 |
| 7,336,602 | B2 * | 2/2008 | Silvester | 370/216 |
| 7,532,571 | B1 * | 5/2009 | Price et al. | 370/225 |
| 2004/0049570 | A1 * | 3/2004 | Frank et al. | 709/223 |
| 2004/0242235 | A1 * | 12/2004 | Witana | 455/452.2 |
| 2007/0211636 | A1 * | 9/2007 | Bellur et al. | 370/238 |

OTHER PUBLICATIONS

"Method and System Effecting Communications in a Wireless Communication Network", Pending U.S. Application filed Aug. 17, 2005: U.S. Appl. No. 11/205,857, 32 pgs.
"Network Aware Cross-Layer Protocol Methods and Apparatus", Pending U.S. Application filed Mar. 23, 2005: U.S. Appl. No. 11/087,257, 26 pgs.
Conti, M., et al., "Cross-Layering in Mobile AD Hoc Network Design", *IEEE Computer*, 37(2), (Feb. 2004), 48-51 pgs.

(Continued)

*Primary Examiner*—Tri H Phan
(74) *Attorney, Agent, or Firm*—Lee & Hayes, PLLC

(57) ABSTRACT

Dynamic selection of communication links in a mixed network having wired and wireless links. An access point is coupled between at least two stations, with the access point coupled to a first station by a wired link and a wireless link. The access point is coupled to the second station by a wireless link. The first and second stations are coupled by a direct wireless link, and also at least two indirect links passing through the access point. A link selection component on the first station is operative to estimate the capacities of the various links, and to select one of the links for transmitting a bitstream. The link selection component can also dynamically re-select a link for continuing an on-going transmission of a given bitstream.

10 Claims, 4 Drawing Sheets

OTHER PUBLICATIONS

Krishnaswamy, D., et al., "Adaptive Modulated Scalable Video Transmission over Wireless Networks with a Game-Theoretic Approach", *IEEE Multimedia Signal Processing Workshop*, (2004), 4 pgs.

Van Der Schaar, M., et al., "Adaptive Cross-Layer Protection Strategies for Robust Scalable Video Transmission over 802.11 WLANs", *IEEE Journal on Selected Areas in Communications*, 21(10), (Dec. 2003),1752-1763 pgs.

* cited by examiner

DYNAMIC SELECTION OF COMMUNICATION LINKS IN A MIXED NETWORK

BACKGROUND

There is increasing demand for higher bandwidth connections between nodes within wide-area networks. A variety of wired and wireless communications technologies, protocols, and related devices have been proposed to meet this demand. For example, IEEE 802.11 defines a set of standards applicable to wireless local area networks (WLANs). In some instances, local area networks (LANs) may contain nodes or stations that can communicate directly or indirectly with other nodes or stations, via either wired or wireless links. Bitstreams containing, for example, audio data, video data, or other types of data may be transmitted between these nodes or stations.

A given station may request to transmit a bitstream to another station. In so doing, this station may have a choice of several different wired or wireless links coupling it directly or indirectly to the other station. These different links may be associated with different bandwidth or bit rate capacities. Selecting the optimal link between the two stations for transmitting the bitstream would minimize frame loss and related frame re-transmissions, and would maximize the aggregate network throughput.

BRIEF DESCRIPTION OF THE DRAWINGS

The subject matter presented herein may be better understood, and its numerous features and advantages made apparent to those skilled in the art by referencing the accompanying drawings. In the figures, the left-most digit(s) of a reference number identifies the figure in which the reference number first appears. The use of the same reference numbers in different figures indicates similar or identical items.

DETAILED DESCRIPTION

Figure 1:
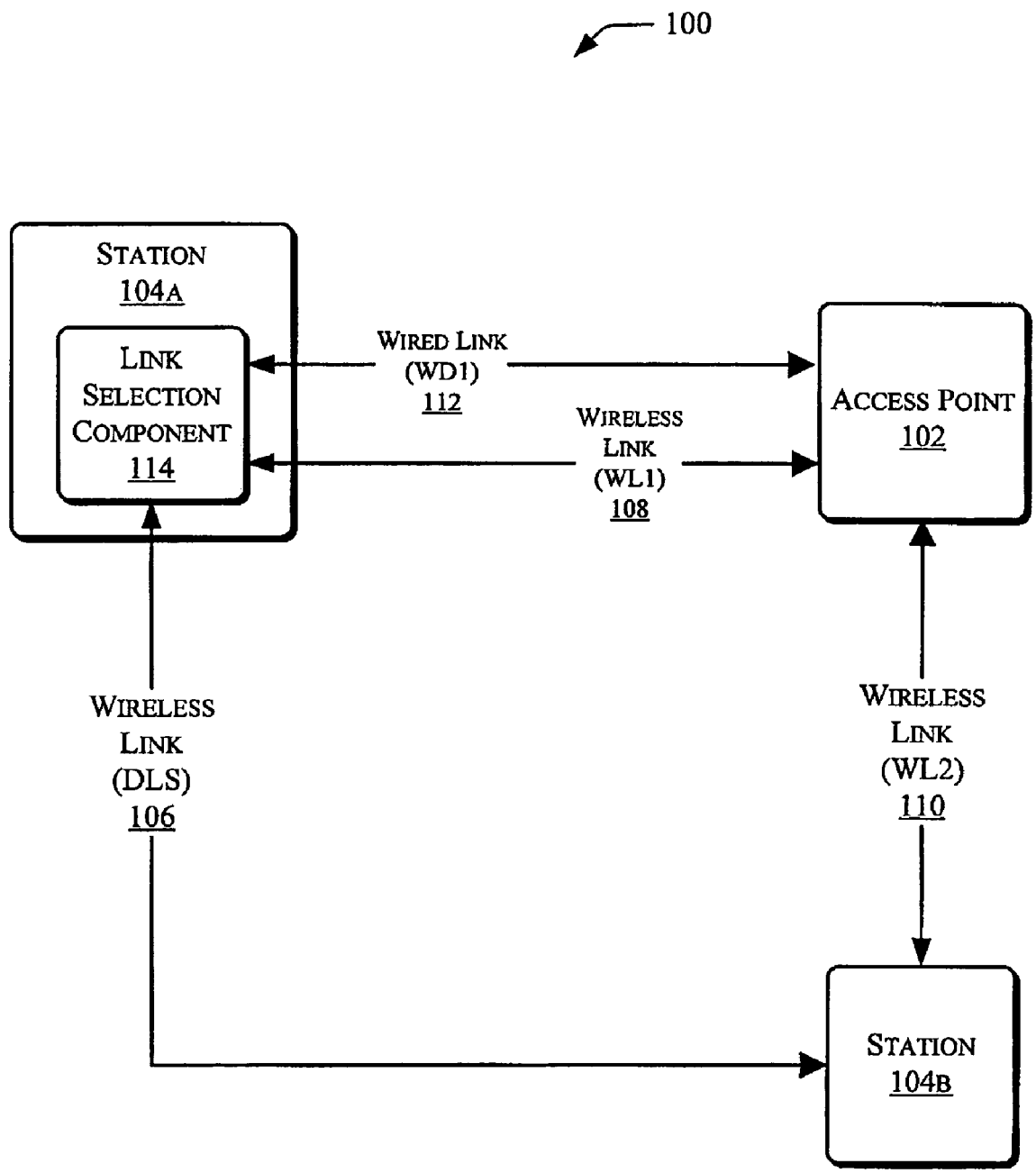
FIG. 1 is a block diagram of a system for performing dynamic selection of communication links in a mixed network.

FIG. 1 illustrates a system 100 for dynamic selection of communication links in a mixed network. The network is described as "mixed" herein to denote that the network includes both wired and wireless communication links, as detailed further below. The system 100 can include an access point 102, a first station 104a, and at least a second station 104b. The stations 104a and 104b are referenced collectively as stations 104.

Without loss of generality, the access point 102 can be implemented as a Quality of Service (QoS)-capable Access Point (QAP), as that term is understood in the context of the general wireless LAN standard defined in IEEE 802.11e. Also, the stations 104 can be implemented as QoS-capable wireless LAN stations (QSTAs), as that term is understood in the same IEEE 802.11e context. More generally, the access point 102 and the stations 104 can be implemented as network nodes that have the features and characteristics described herein.

The first station 104a and the second station 104b can be coupled to communicate directly or indirectly via several possible links, which are now described. A first link provides a direct wireless link (DLS) 106 between the first station 104a and the second station 104b. A second link provides an indirect link that includes a first wireless link (WL1) 108 between the first station 104a and the access point 102, and that includes at least a second wireless link 110 between the access point 102 and the second station 104b. A third link provides a mixed (i.e., wired-wireless) indirect link that includes a wired link (WD1) 112 between the first station 104a and the access point 102, and that includes the wireless link (WL2) 110 between the access point 102 and the second station 104b.

Turning to the first station 104a now in more detail, it includes a link selection component 114 that is operative to estimate the respective capacities of the first, second, and third links described above. The link selection component 114 can also dynamically select one of the links for transmitting a given stream of data based on the estimated capacities of the links. Finally, should the capacity of one of the links change during transmission of the data stream, the link selection component 114 can re-estimate the link capacities of the different links, and select a different one of the links for transmitting the rest of the data stream.

FIG. 1 illustrates two stations 104 for convenience only, and not to limit possible implementations of the operating environment 100. It is noted that the operating environment 100 could contain more than two such stations 104, and in general can include N stations 104, where N is any integer greater than one. Additionally, the link selection component 114 could reside in stations other than the station 104a as well, for example, the station 104b or another station 104.

Figure 2:
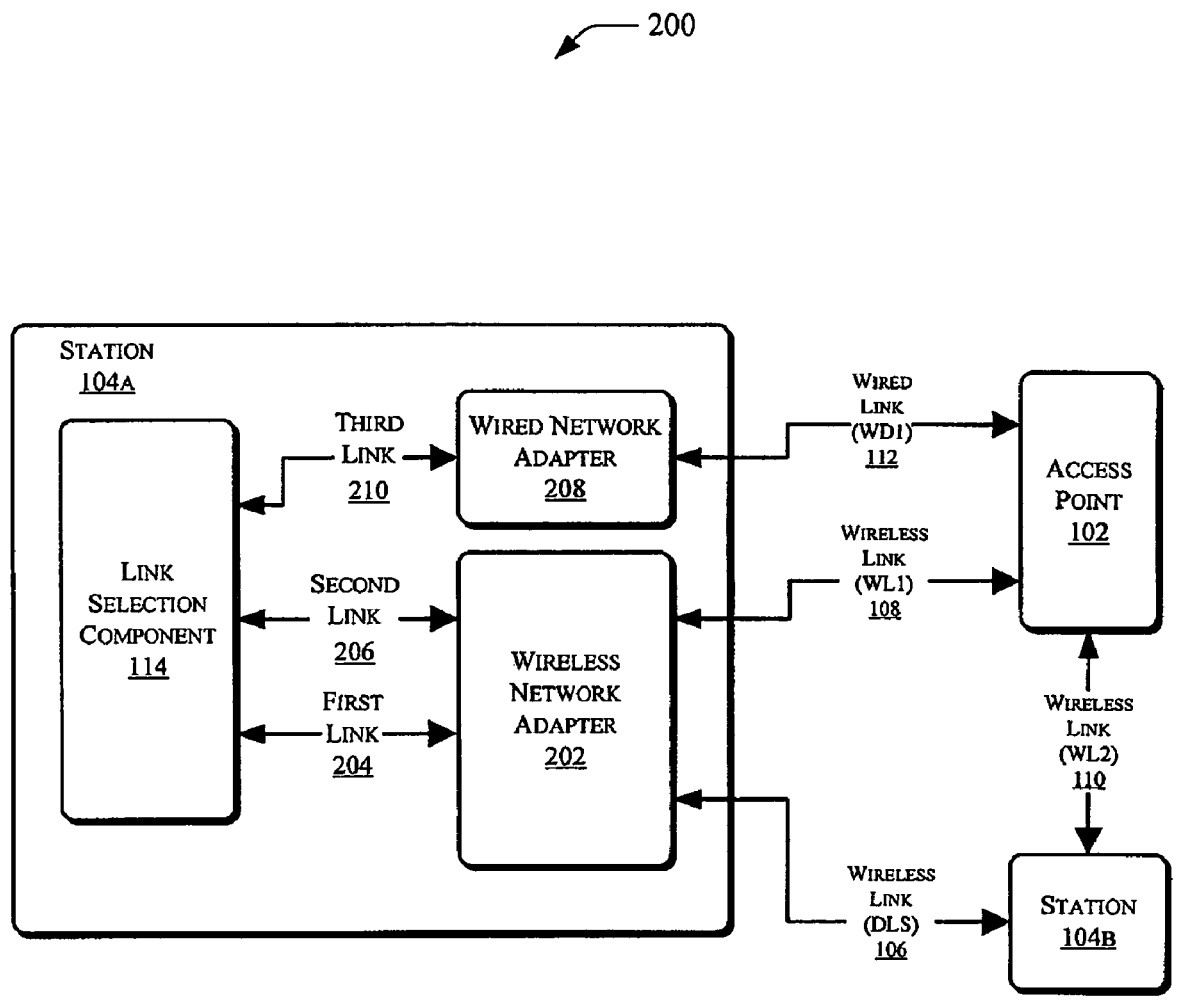
FIG. 2 is a block diagram of an operating environment for performing dynamic selection of communication links in a mixed network that includes features additional to those shown in FIG. 1.

FIG. 2 illustrates an operating environment 200 that includes features in addition to those shown in FIG. 1. Beginning with the station 104a, a wireless network adapter 202 interfaces the station 104a to the wireless links 106 and 108. Recall that the wireless link 106 communicates directly with the second station 104b. For convenience of reference, the direct wireless link 106 as associated with the wireless network adapter 202 is referred to herein as a first link 204.

The wireless network adapter 202 also interfaces the station 104a to the wireless link 108. Recall that the wireless link 108 communicates indirectly with the second station 104b, through the wireless link 110 coupling the access point 102 to the second station 104b. For convenience of reference, the indirect wireless link 108 as associated with the wireless network adapter 202 is referred to herein as a second link 206. For convenience only, FIG. 2 shows an example implementation in which the two or more wireless links 106 and 108 are coupled through the same wireless adapter 202 provided by the first station 104a. However, it is understood that other implementations of the station 104a could include separate, respective wireless adapters 202 for each of the wireless links 106 and 108. In the latter implementations, the station 104a may also include means for directing the respective bitstreams for the wireless links 106 and 108 to the corresponding wireless adapters 202.

A wired network adapter 208 interfaces the first station 104a to the wired link 112. Recall also that a communication link including the wired link 112 and the wireless link 110 may be considered a mixed link, because it includes wired and wireless sub-links. For convenience of reference, the wired link 112 as associated with the wired network adapter 208 is referred to herein as a third link 210.

The link selection component 114 is configured to activate or select one of the adapters 202 or 208 to select a corresponding one of the first link 204, the second link 206, or the third link 210. For convenience of illustration, any signals by which the link selection component 114 selects or actives one of the adapters 202 or 208 are considered illustrated by the lines represented by the links 204, 206, or 210.

It is noted that the access point 102 and the second station 104b can also include network adapters that may be similar to the adapters 202 or 208 that are shown within the station 104a. However, for clarity of illustration, these adapters are not shown in FIG. 2.

Figure 4:
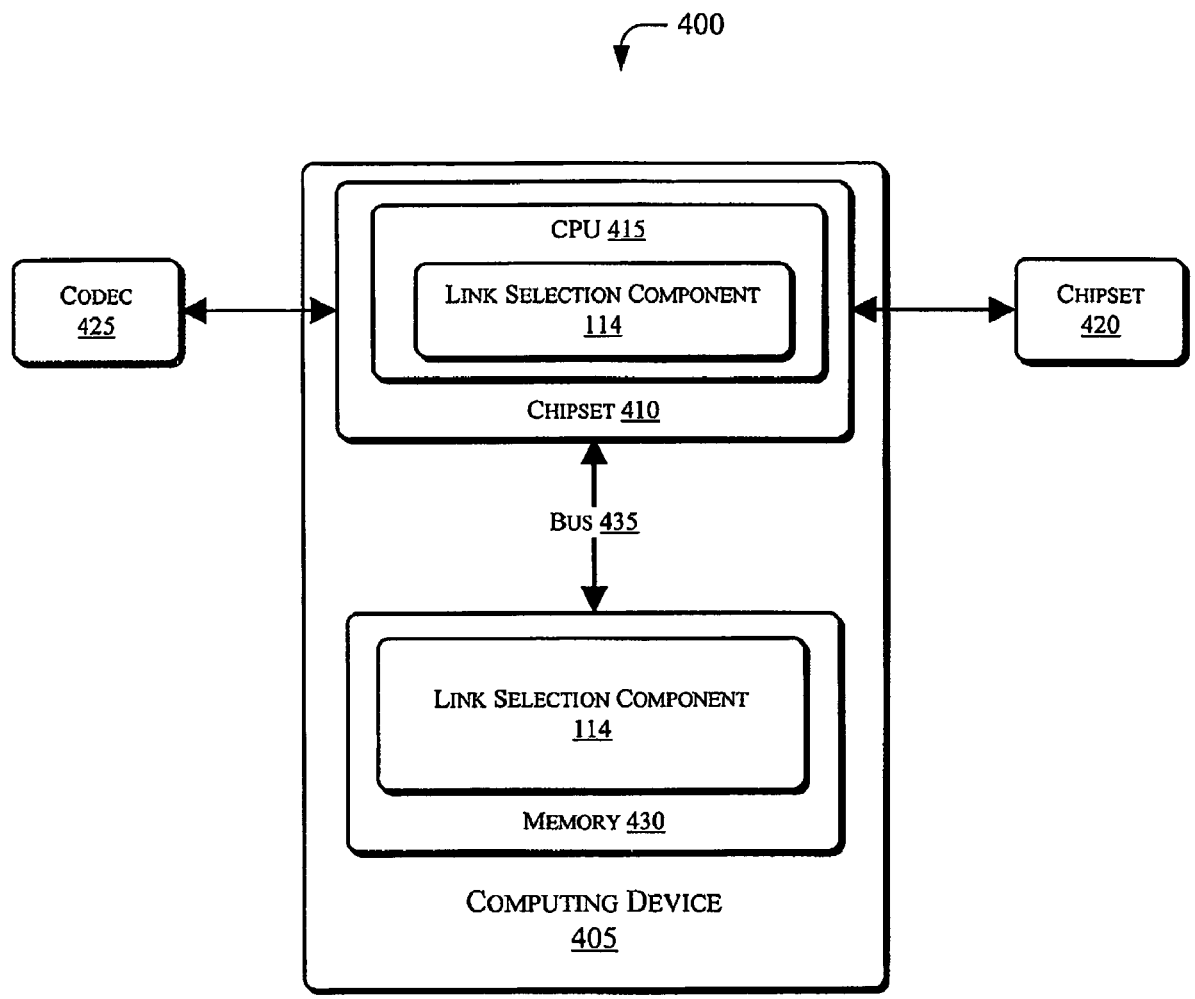
FIG. 4 is a block diagram of an overall computing environment relating to software or computer-readable media that may implement dynamic selection of communication links in a mixed network.

For convenience of subsequent description, particularly in connection with FIG. 4, the indirect wired link 112 between the wired adapter 208 and the access point 102 is denoted as WD1. The indirect wireless link 108 between the wireless adapter 202 and the access point 102 is denoted as WL1. The indirect wireless link 110 between the access point 102 and the second station 104b is denoted as WL2. Finally, the direct wireless link 106 between the wireless adapter 202 and the second station 104b is denoted as DLS.

Illustrative processes by which the link selection component 114 can estimate link capacities and select one of the links 204, 206, and 210 for transmitting a given bitstream are now described in connection with FIG. 3.

Figure 3:
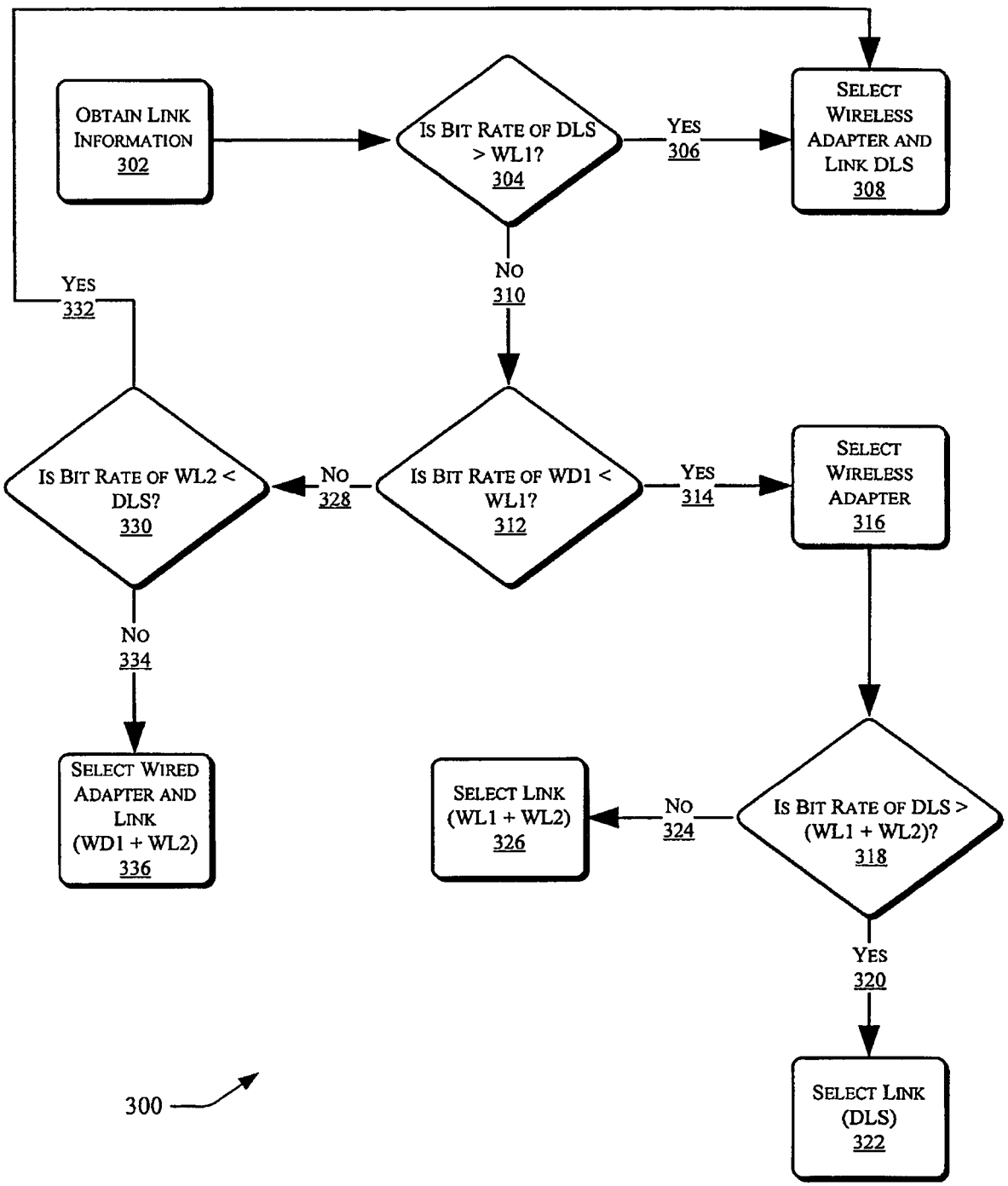
FIG. 3 is a flow diagram of a process flow for selecting a link by which to transmit the bitstream.

FIG. 3 illustrates a process flow 300 for selecting a link 204, 206, or 210 for transmitting the bitstream. In some implementations, the process flow 300 may be performed, at least in part, by the link selection component 114 shown in FIGS. 1 and 2. However, it is understood that the process flow may be performed, at least in part, by components other than the link selection component 114 without departing from the scope and spirit of the subject matter described herein.

For convenience, but not limitation, the process flow 300 is described with reference to the labels DLS, WD1, WL1, and WL2 shown in FIG. 2. Recall that:
the wireless link 108 (DLS) directly couples the first station 104a to the second station 104b;
the wired link 112 (WD1) indirectly couples the first station 104a to the second station 104b via the access point 102;
the wireless link 108 (WL1) indirectly couples the first station 104a to the second station 104b via the access point 102; and
the wireless link 110 (WL2) directly couples the access point 102 to the second station 104b.

In light of the foregoing, the link selection component 114 can choose from among at least three different links 204, 206, or 210 in deciding how to transmit the bitstream from the first station 104a to the second station 104b. The first link 204 includes the direct wireless link 106 (DLS). The second link 206 includes the indirect wireless link 108 (WL1) and the indirect wireless link 110 (WL2). The third link 219 includes the indirect wired link 112 (WD1) and the indirect wireless link 110 (WL2).

Turning to the process flow 300 in detail, in block 302, the current bit rates supported by the various links WD1, WL1, WL2, and DLS are obtained. In block 304, the process flow 300 compares the bit rate of the direct wireless link DLS to that of the indirect wireless link WL1. If the bit rate of the link DLS is greater than that of WL1, then the process flow 300 takes branch 306 to block 308. In block 308, the wireless adapter 202 and related link 106 (DLS) is selected for transmitting the bitstream.

From block 304, if the bit rate of the link DLS is not greater than that of WL1, then the process flow 300 takes branch 310 to block 312. In block 312, the process flow 300 compares the bit rate of the indirect wired link WD1 to that of the indirect wireless link WL1. If the bit rate of the link WD1 is less than the bit rate of the link WL1, then the process flow 300 takes branch 314 to block 316.

In block 316, the process flow 300 selects the wireless adapter 202. In block 318, the process flow 300 selects between the direct wireless link 106 (DLS) and the indirect wireless link 110 (WL1) combined with the indirect wireless link 112 (WL2), passing through the access point 102. More particularly, in block 318, the process flow 300 can assess the throughput of the access point 102 and the bit rates supported by the indirect links 110 (WL1) and 112 (WL2), and compare the foregoing to the bit rate of the direct link 108 (DLS). For example, block 318 can evaluate whether the bit rate of the direct link 108 (DLS) is greater than the combined effective bit rates of the indirect links 110 (WL1) and 112 (WL2) (WL1+WL2). If so, the process flow 300 takes branch 320 to block 322. Block 322 represents selecting the direct link 108 (DLS).

Returning to block 318, if the bit rate of the direct link 108 (DLS) is not greater than the combined effective bit rates of the indirect links 110 (WL1) and 112 (WL2) (WL1+WL2), then the process flow 300 takes branch 324 to block 326. Block 326 represents selecting the combined indirect links 110 and 112 (WL1+WL2).

Returning to block 312, if the bit rate of the link WD1 is not less than the bit rate of the link WL1, then the process flow 300 takes branch 328 to block 330. In block 330, the process flow 300 compares the bit rate of the indirect wireless link 110 (WL2) to the bit rate of the direct wireless link 106 (DLS). If the bit rate of WL2 is less than the bit rate of DLS, then the process flow 300 takes branch 332 to block 308. Block 308 was described above, and represents selecting the wireless adapter 202 and the direct wireless link 106 (DLS).

From block 330, if the bit rate of WL2 is not less than the bit rate of DLS, then the process flow 300 takes branch 334 to block 336. In block 336, the process flow 300 selects the wireless adapter 202 and selects the indirect mixed link including the indirect wired link 112 (WD1) and the indirect wireless link 110 (WL2).

FIG. 4 illustrates an overall computing environment 400 for implementing the teachings herein in software, or on program storage devices or computer-readable media. For example, at least the link selection component 116 as described above may be implemented, at least in part, using the computing environment 400. The computing environment 400 may also be used in connection with designing, testing, simulating, or modeling the link selection component 116, as described further below.

A computing device 405 can include a chipset 410 containing at least a CPU 415, which may access and execute software implementing the link selection component 114. Alternatively, the CPU 410 may be adapted to communicate operatively with an external chipset 420. One or more of the chipsets 410 or 420 may be coupled to communicate with one or more software- or hardware-based entities, and example of which is at least one coder-decoder (codec) 425. The codec 425 may be adapted to process audio or video data passing to or from the stations 104 and/or the access point 102, for example.

In some embodiments of the subject matter described herein, at least the link selection component 114 described herein may be implemented as software, in contexts including but not limited to software emulations or simulations the same, or in realizations of the teachings herein as microcode or firmware. Software may also be used in modeling, emulating, or simulating at least the link selection component 114, as described herein, to facilitate design, testing, and analysis. In such embodiments, at least software-based implementations of the link selection component 114 may reside in a memory 430, which may communicate with the chipset 410 via a bus 435. It is understood that the layout of the bus 435 is shown in FIG. 4 for convenience and clarity of illustration. The bus 435 may be of any data width or any bandwidth as chosen by those skilled in the art for a given implementation. The memory 530 can be implemented to have one or more read-only memory (ROM) portions, one or more random-access memory (RAM) portions, and/or one or more flash-memory portions.

It is understood that computer-readable media or program storage devices suitable for storing software executing the processes taught herein can include at least the memory 430. The memory 430 can take any convenient form, whether based on semiconductor, optical, or magnetic storage technology. It is further understood that signals representing the software-based implementations of the link selection component 114 may be propagated via the bus 435.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A station comprising:
  a wired network adapter to interface the station indirectly to at least a second station via a first link, wherein the first link is a mixed link that includes at least one wired link and at least one wireless link;
  a wireless network adapter to interface the station indirectly to the second station via a second link, wherein the second link includes a plurality of wireless links, wherein the wireless network adapter interfaces the station directly to the second station via a third link; and
  a link selection component that:
    estimates the respective capacities of the first, second, and third links;
    dynamically selects one of the links for transmission of a bitstream based on the estimation of the capacities of the first, second, and third links;
    monitors the respective capacity of the first, second, and third link after selecting the one link for transmission of the bitstream as the bitstream is transmitted; and
    should the respective capacity of one of the links not dynamically selected exceed the capacity of the selected link, selects a different link of the first, second and third links to transmit the remainder of the bitstream.

2. The station of claim 1, wherein the link estimate component selects one of the first, second, and third links for beginning transmission of the bitstream.

3. A system comprising:
  a first station, wherein the first station is configured to communicate with a second station via:
    a first link, wherein the first link comprises a direct wireless link between the first station and the second station;
    a second link, wherein the second link comprises an indirect wireless link between the first station and the second station; and
    a third link, wherein the third link comprises an indirect mixed link between the first station and the second station; and
  wherein the first station includes a link selection component that:
    estimates the respective capacities of the first, second, and third links;
    dynamically selects one of the links for transmission of a bitstream based on the estimation of the capacities of the first, second, and third links;
    monitors the respective capacity of the first, second, and third link after selecting the one link for transmission of the bitstream as the bitstream is transmitted; and
    should the respective capacity of one of the links not dynamically selected exceed the capacity of the selected link, selects a different link of the first, second and third links to transmit the remainder of the bitstream.

4. The system of claim 3, further comprising an access point intermediate the first station and the second station, and wherein the second link includes a first wireless link to couple the first station to the access point, and includes at least a second wireless link to couple the access point to the second station.

5. The system of claim 3, further comprising an access point intermediate the first station and the second station, and wherein the third link includes a wired link to couple the first station to the access point, and includes at least a wireless link to couple the access point to the second station.

6. The system of claim 3, wherein the first station includes a wired network adapter to interface the first station indirectly to the second station.

7. The system of claim 3, wherein the first station includes a wireless network adapter to interface the first station at least directly to the second station.

8. The system of claim 3, wherein the link estimate component selects one of the first, second, and third links for beginning transmission of the bitstream.

9. A method comprising:
  configuring a first station to communicate with a second station, wherein the first station communicates with the second station through a plurality of links comprising:
    a first link, wherein the first link comprises a direct wireless link between the first station and the second station;
    a second link, wherein the second link comprises an indirect wireless link between the first station and the second station; and
    a third link, wherein the third link comprises an indirect mixed link between the first station and the second station;
  estimating the respective capacities of the first, second, and third links, wherein a link selection component of the first station performs the estimation;

dynamically selecting one of the links for transmission of d bitstream based on the estimation of the capacities of the first, second, and third links, wherein the first station dynamically selects the link for transmission of the bitstream;

monitoring the respective capacity of the first, second, and third link after selecting the one link for transmission of the bitstream as the bitstream is transmitted, wherein the first station monitors the respective capacity; and should the respective capacity of one of the links not dynamically selected exceed the capacity of the selected link, selecting a different link of the first, second and third links to transmit the remainder of the bitstream, wherein the first station selects the different link.

10. The method of claim 9, wherein dynamically selecting one of the links for transmission of a bitstream comprises selecting one of the links for beginning transmission of the bitstream.

* * * * *